United States Patent [19]
Iverson

[11] Patent Number: 5,774,191
[45] Date of Patent: Jun. 30, 1998

[54] CHROMA-KEY COLOR RANGE DETERMINATION

[75] Inventor: Vaughn Iverson, Beaverton, Oreg.

[73] Assignee: Intel Corporation, Santa Clara, Calif.

[21] Appl. No.: 670,611

[22] Filed: Jun. 26, 1996

[51] Int. Cl.$^6$ .................................................. H04N 9/75
[52] U.S. Cl. ....................... 348/592; 348/587; 348/672
[58] Field of Search .................................. 348/587, 592, 348/672; H04N 9/75

[56] References Cited

U.S. PATENT DOCUMENTS 5,630,037   5/1997   Schindler ............................... 348/592

*Primary Examiner*—Sherrie Hsia
*Attorney, Agent, or Firm*—William H. Murray, Esq.

[57] ABSTRACT

Histograms are generated for one or more of the image components. Each histogram is clipped at each end to exclude outlying values and to identify initial minimum and maximum values. Conservatism terms are included in each of the initial minimum and maximum values to generated final minimum and maximum values that are used as thresholds to define the color range used in chroma-key processing. In one embodiment, the first frame of a video sequence is designated as a chroma-key frame that is analyzed to determine the chroma-key color range.

10 Claims, 4 Drawing Sheets

FIG. 1. ENCODING SYSTEM

CHROMA-KEY COLOR RANGE DETERMINATION

CROSS-REFERENCES TO RELATED APPLICATIONS

This application is related to U.S. patent application Ser. No. 08/669,079, filed Jun. 24, 1996 as attorney docket no. 366431-134 ("the '1134 application") using U.S. Express Mail Label No. EG132603637, the teachings of which are incorporated herein by reference.

BACKGROUND OF THE INVENTION

1. Field of the Invention

The present invention relates to image processing, and, in particular, to transparency processing based on chroma keying.

2. Description of the Related Art

In one type of conventional chroma keying, two video streams are combined to form a blended video stream by applying special chroma-key-based processing. For example, in the classic "weatherman standing in front of a weather map" situation, there are two input video streams: one of the weatherman standing in front of a substantially monochromatic (e.g., blue) background and one of the weather map. A blended "chroma-keyed" video stream is generated by applying the following logic pixel by pixel: select a pixel from the weatherman video stream, unless it is blue, in which case, the corresponding pixel from the weather map video stream is selected. The result is a blended video stream in which the weatherman appears to be standing in front of the weather map.

In real video data (i.e., video data generated by a video camera), the components for the pixels corresponding to the ostensibly monochromatic background will in fact vary slightly from pixel to pixel due to changes in lighting, shadowing, noise, and other factors. As such, the logic used in the chroma-key-based processing may define the chroma-key color as a specified finite range of colors. If that specified range of colors is too small, then portions of the monochromatic background from the weatherman video stream may appear in the weather map regions of the blended video stream. Similarly, if the specified chroma-key color range is too large, then the weatherman may appear in the blended video stream to have holes with portions of the weathermap appearing in the holes. Moreover, if the specified chroma-key color range is centered poorly, then both effects may occur in the same blended video stream. All of these can contribute to a degradation of the blended video stream.

Chroma keying includes other types of processing besides the generation of a blended video stream from two input video streams. For example, chroma keying may be applied during the compression of a single video stream to identify those regions of each video frame that are to be encoded. By encoding only those "dirty" regions not associated with the chroma-key color, the number of bits used to represent the video stream in the encoded bitstream may be reduced.

The present invention is directed to an improved scheme for selecting the range of colors used in chroma-key-based processing of video streams, in particular, and image data, in general.

Further objects and advantages of this invention will become apparent from the detailed description which follows.

SUMMARY OF THE INVENTION

The present invention is directed to performing chroma-key processing on images. According to one embodiment, a first set of image signals comprising one or more components is received and a histogram is generated for each of one or more of the components. A chroma-key color range is generated from each histogram of the one or more histogram and chroma-key processing is performed on a second set of image signals using the chroma-key color range.

BRIEF DESCRIPTION OF THE DRAWINGS

Other objects, features, and advantages of the present invention will become more fully apparent from the following detailed description, the appended claims, and the accompanying drawings in which:

DETAILED DESCRIPTION

The present invention is directed to a scheme for selecting a range of colors for use in chroma-key-based processing. In the following sections, the invention is described in the context of using chroma-keying to generate transparency masks used in compressing a single video stream. It will be understood that the present invention applies to other chroma-key-based processing, such as the blending of two video streams together.

In one embodiment, the first frame of a video stream is designated as a chroma-key frame. This chroma-key frame is analyzed to select minimum and maximum threshold values that define the range of chroma-key colors for conventional chroma-key-based processing. These threshold values may then be applied to each of the subsequent video streams to generate transparency masks used in subsequent compression processing of the video data, including chroma subsampling of the video data.

System Hardware Architectures

Figure 1:
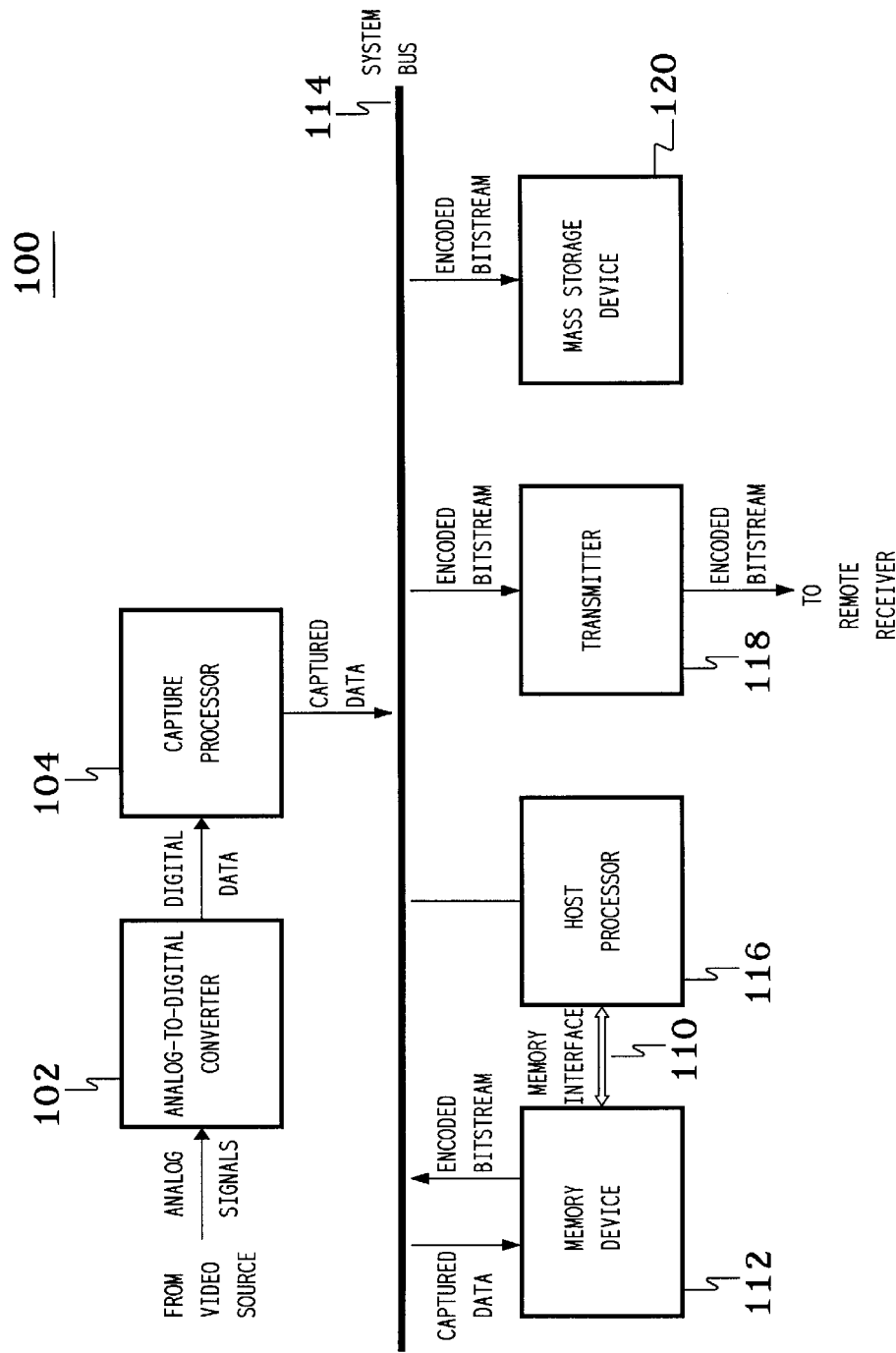
FIG. 1 is a block diagram of a video system for encoding video signals in a PC environment, according to one embodiment of the present invention.

Referring now to FIG. 1, there is shown a computer system 100 for encoding video signals, according to one embodiment of the present invention. Analog-to-digital (A/D) converter 102 of encoding system 100 receives analog video signals from a video source. The video source may be any suitable source of analog video signals such as a video camera or VCR for generating local analog video signals or a video cable or antenna for receiving analog video signals from a remote source. A/D converter 102 separates the analog video signal into constituent components and digitizes the analog components into digital video component data (e.g., in one embodiment, 8-bit R, G, and B component data in RGB24 format).

Capture processor 104 captures the digital 3-component video data received from converter 102. In one embodiment of the present invention, capture processor 104 selectively stores the captured data in full-resolution RGB24 format to memory device 112 and/or mass storage device 120 via system bus 114. Those skilled in the art will understand that, for real-time encoding, the captured data may be stored to memory device 112, while for non-real-time encoding, the captured data may be stored to mass storage device 120.

During real-time encoding, host processor 116 reads the captured bitmaps from memory device 112 via high-speed memory interface 110 and generates an encoded video bitstream that represents the captured video data. As described in the next section of this specification, host processor 116 converts the video data in RGB24 format to a YUV24 format, where each pixel is represented by 8-bit Y, U, and V components. Host processor 116 also performs chroma subsampling on the video data to generate video data in a subsampled format. In one embodiment, host processor 116 generates subsampled video data in a YUV9 (i.e., YUV 4:1:0) format, in which every (4×4) block of pixels of tie Y-component plane corresponds to a single pixel in the U-component plane and a single pixel in the V-component plane. When performing chroma subsampling, host processor 116 takes into account transparency information in the form of a transparency mask. As described in the next section, this transparency mask may be generated by host processor 116 using chroma-key-based processing.

Depending upon the particular encoding scheme implemented, host processor 116 applies a sequence of compression steps to reduce the amount of data used to represent the information in the video images. In one embodiment of the present invention, host processor 116 applies some form of transparency processing as part of its encoding scheme. The resulting encoded video bitstream is then stored to memory device 112 via memory interface 110. Host processor 116 may copy the encoded video bitstream to mass storage device 120 and/or transmit the encoded video bitstream to transmitter 118 for real-time transmission to a remote receiver (not shown ill FIG. 1).

Figure 2:
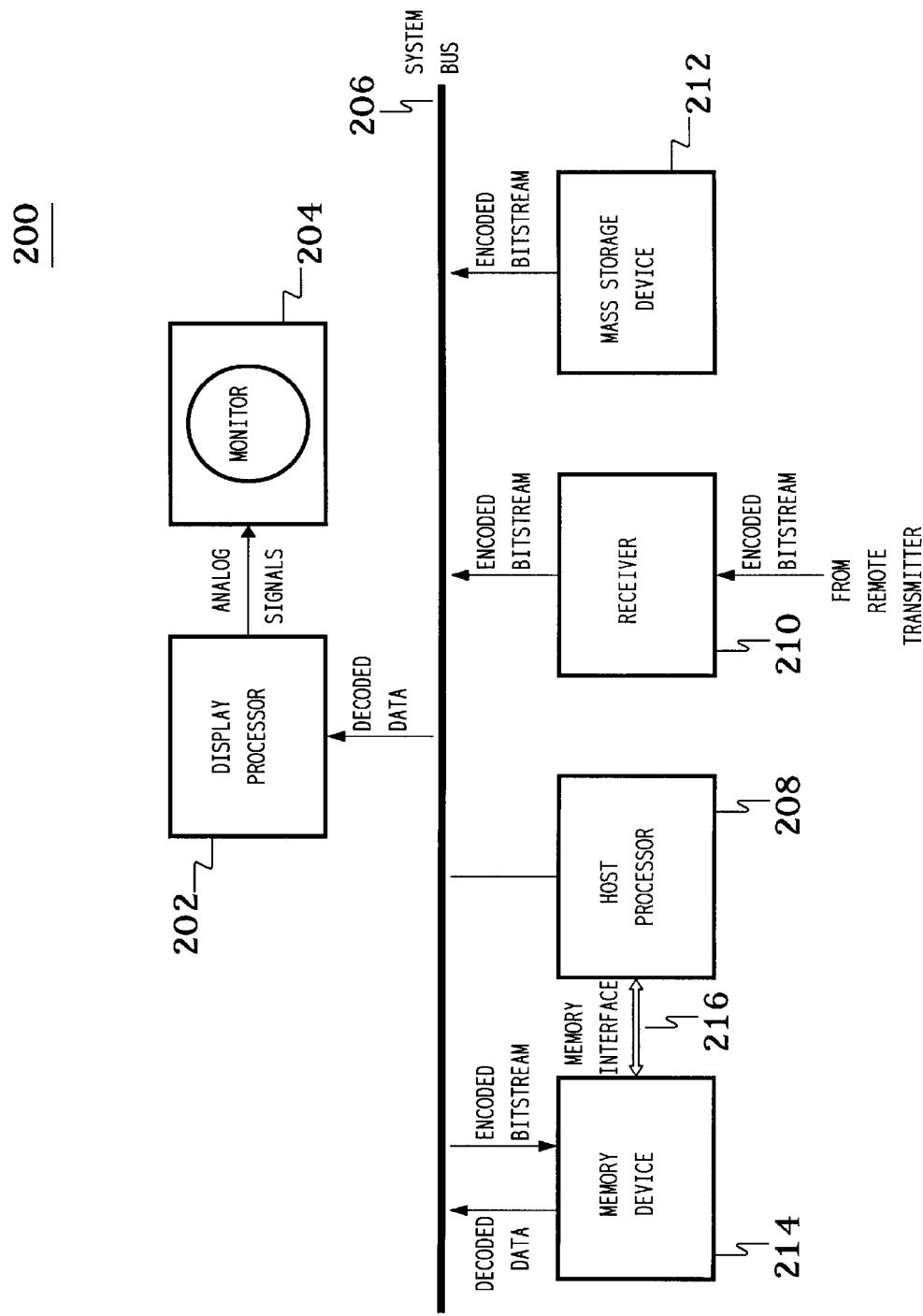
FIG. 2 is a computer system for decoding the video signals encoded by the computer system of FIG. 1, according to one embodiment of the present invention.

Referring now to FIG. 2, there is shown a computer system 200 for decoding the encoded video bitstream encoded by encoding system 100 of FIG. 1, according to one embodiment of the present invention. The encoded video bitstream is either read from mass storage device 212 of decoding system 200 or received by receiver 210 from a remote transmitter, such as transmitter 118 of FIG. 1. The encoded video bitstream is stored to memory device 214 via system bus 206.

Host processor 208 accesses the encoded video bitstream stored in memory device 214 via high-speed memory interface 216 and decodes the encoded video bitstream for display. Decoding the encoded video bitstream involves undoing the compression processing implemented by encoding system 100 of FIG. 1. Host processor 208 stores the resulting decoded video data to memory device 214 via memory interface 216 from where the decoded video data are transmitted to display processor 202 via system bus 206. Alternatively, host processor 208 transmits the decoded video data directly to display processor 202 via system bus 206. Display processor 202 processes the decoded video data for display on monitor 204. The processing of display processor 202 includes digital-to-analog conversion of the decoded video data. After being decoded by host processor 208 but before being D/A converted by display processor 202, the decoded video data may be upsampled (e.g., from YUV9 to YUV24), scaled, and/or color converted (e.g., from YUV24 to RGB24). Depending upon the particular embodiment, each of these processing steps may be implemented by either lost processor 208 or display processor 202.

Referring again to FIG. 1, encoding system 100 may be a microprocessor-based personal computer (PC) system with a special purpose video-processing plug-in board. In particular, A/D converter 102 may be any suitable means for decoding and digitizing analog video signals. Capture processor 104 may be any suitable processor for capturing digital video component data as subsampled frames. In one embodiment, A/D converter 102 and capture processor 104 are contained in a single plug-in board capable of being added to a microprocessor-based PC system.

Host processor 116 may be any suitable means for controlling the operations of the special-purpose video processing board and for performing video encoding. Host processor 116 may be a general-purpose microprocessor manufactured by Intel Corporation, such as an i486™ microprocessor, Pentium® processor, or Pentium® Pro processor. System bus 114 may be any suitable digital signal transfer medium such as a Peripheral Component Interconnect (PCI) bus. Memory device 112 may be any suitable computer memory device such as one or more dynamic random access memory (DRAM) devices. High-speed memory interface 110 may be any suitable means for interfacing between memory device 112 and host processor 116. Mass storage device 120 may be any suitable means for storing digital data such as a computer hard drive. Transmitter 118 may be any suitable means for transmitting digital data to a remote receiver such as a modem. Those skilled in the art will understand that the encoded video bitstream may be transmitted using any suitable means of transmission such as telephone line RF antenna, local area network, or wide area network.

Referring again to FIG. 2, decoding system 200 may be a microprocessor-based PC system similar to the basic PC system of encoding system 100. In particular, host processor 208 may be any suitable means for decoding an encoded video bitstream such as a general-purpose microprocessor manufactured by Intel Corporation, such as an i486™ microprocessor, Pentium® processor, or Pentium® Pro processor. System bus 206 may be any suitable digital data transfer medium such as a PCI bus. Mass storage device 212 may be any suitable means for storing digital data such as a CD-ROM device or a hard drive. Receiver 210 may be any suitable means for receiving the digital data transmitted by transmitter 118 of encoding system 100 such as a modem. Display processor 202 and monitor 204 may be any suitable devices for processing and displaying video images (including the conversion of digital video data to analog video signals) and may be parts of a PC-based display system having a PCI 24-bit graphics board and an RGB monitor.

In one embodiment, encoding system 100 of FIG. 1 and decoding system 200 of FIG. 2 are two distinct computer systems. In an alternative embodiment of the present invention, a single computer system comprising all of the different components of systems 100 and 200 may be used to encode and decode video images. Those skilled in the art will understand that such a combined system may be used to display decoded video images in real-time to monitor the capture and encoding of video stream.

In alternative embodiments of present invention, the video encode processing of an encoding system and/or the video decode processing of a decoding system may be assisted by a pixel processor or other suitable component(s) to off-load processing from the host processor by performing computationally intensive operations.

Chroma-Key Color Range Determination

Figure 3:
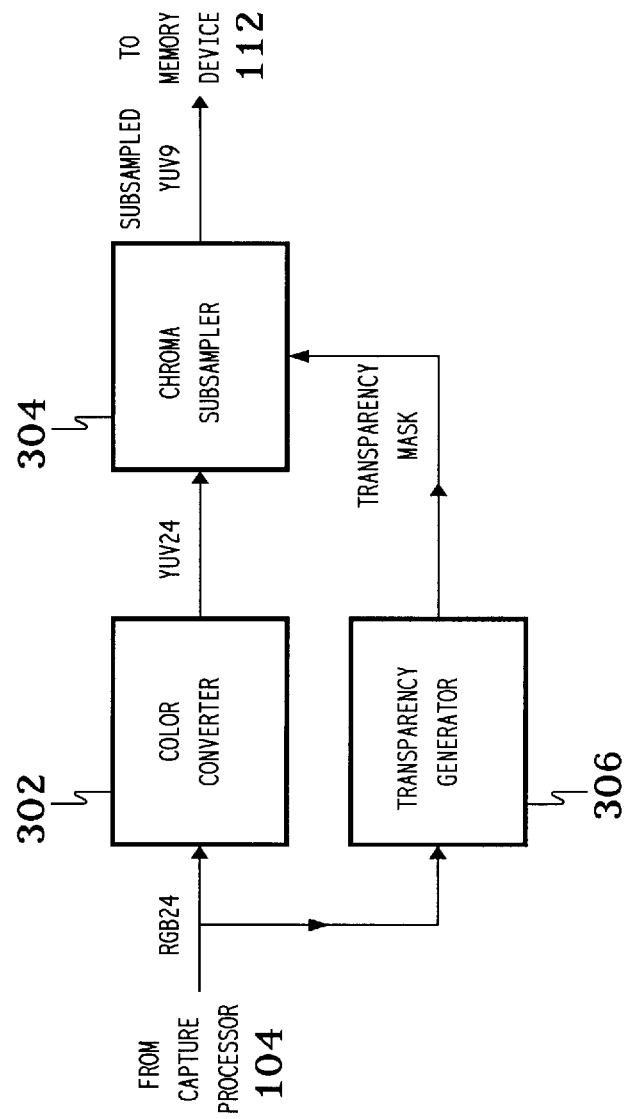
FIG. 3 is a block diagram of part of the host processor of FIG. 1.

Referring now to FIG. 3, there is shown a block diagram of the part of host processor 116 of FIG. 1 that performs transparency generation, color conversion, and chroma subsampling, according to one embodiment of the present invention. Transparency generator 306 receives the digitized RGB24 data captured by capture processor 104 of FIG. 1 and generates transparency masks. In one embodiment, these transparency masks are generated by applying chroma-key-based processing to each frame to determine which pixels of each frame are transparent and which are opaque. The determination of transparent and opaque pixels for a frame defines the transparency mask for that frame. The determination of the range of colors used for the chroma-key-based processing is described in further detail later in this specification in conjunction with FIG. 4.

Color converter 302 also receives the digitized RGB24 data that was captured by capture processor 104 of FIG. 1 and converts the RGB24 data into YUV24 data. Chroma subsampler 304 receives the YUV24 data from color converter 302 and the transparency mask from transparency generator 306 and generates subsampled YUV9 data by subsampling the U and V components taking into account the transparency mask as described in the section entitled "Subsampling with Transparency Processing" in the '1134 application. Chroma subsampler 304 may also apply image scaling in which all of the component planes are resized in similar fashion. In that case, chroma subsampler 304 would operate as a more generic image scaler rather than exclusively as a subsampler chroma data.

Figure 4:
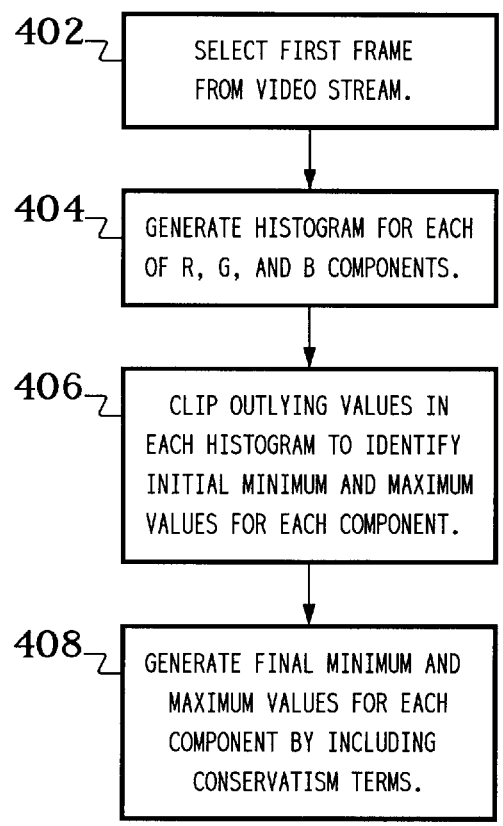
FIG. 4 is a flow diagram of the processing implemented by the transparency generator of FIG. 3 to generate a range of colors to be used for chroma-key-based processing.

Referring now to FIG. 4, there is shown a flow diagram of the processing implemented by transparency generator 306 of FIG. 3 to generate a range of colors to be used for chroma-key-based processing, according to one embodiment of the present invention. The first frame of the video sequence received by encoding system 100 of FIG. 1 may be a chroma-key frame that contains pixels corresponding only to the ostensibly monochromatic background. Transparency generator 306 selects this frame for special chroma-key processing as captured by capture processor 104 of FIG. 1 (step 402 of FIG. 4).

Transparency generator 306 generates a histogram for each of the R, G, and B components based on the pixels of the selected first frame (step 404). Each histogram identifies how many times each of the different component values occurs in the first frame.

Transparency generator 306 identifies initial minimum and maximum values for each component by clipping the outlying values in each histogram (step 406). This may be accomplished by calculating how many pixels are expected to be outside of the initial range defined by the initial minimum and maximum component values. This may be derived by dividing the number of pixels in the first frame by a specified constant (e.g., 500). For noisy images, the divisor could be higher; for cleaner images, lower. The initial minimum value for a component is identified by adding up the cumulative number of occurrences of pixels in the corresponding histogram starting at the lowest component value (i.e., 0) and increasing until the specified number of outlying pixels is reached. Similarly, the initial maximum value for a component is identified by adding up the cumulative number of occurrences of pixels in the corresponding histogram starting at the highest component value (e.g., 255 for 8-bit data) and decreasing until the specified number of outlying pixels is reached.

Transparency generator 306 generates final minimum and maximum values for each component by including conservatism terms (step 408) to allow for some lighting and reflection differences in the subsequent video frames, and to remove some of the chroma fringing at the edges of non-transparent objects. This conservatism may be added relative to the size of the range that remains after the histogram clipping of step 406 is performed, as follows:

New_High=High+(High—Low)/Const

New_Low=Low-(High—Low)/Const

In one embodiment, Const is 2. These operations are applied to all three color components.

The resulting final minimum and maximum component values are used as thresholds in determining which pixels in the subsequent video frames are transparent and which are opaque. If each of the components of a pixel falls within the corresponding range defined by the minimum and maximum thresholds for that component, then the pixel is said to be transparent. Otherwise, at least one of the pixel components falls outside of the corresponding component color range and the pixel is said to be opaque.

The chroma-key processing of the present invention may be applied in different image processing applications. It may be applied as in the embodiment described above in encoding a single video stream. It may be applied to the blending of two (or more) video streams together. It may also be applied in such applications as window clipping and image segmentation.

The present invention also covers still image processing in addition to video processing. Moreover, the image data need not be generated by a video camera. For example, the image data may be computer-generated animation or other video graphics data, although, in such situations, background colors can typically be defined as being truly monochromatic.

In the embodiment shown in FIG. 4, the chroma-key color range is generated based on the first frame of a video sequence and then applied to the subsequent frames of that video sequence. Those skilled in the art will understand that other embodiments are also within the scope of the present invention. For example, the chroma-key color range may be generated based on one or more frames and those frames need not necessarily include the first frame in a video sequence. Moreover, the one or more frames used to generate the chroma-key color range may be part of a video sequence different from the video sequence to which the chroma-key color range is applied. In general, the chroma-key color range is generated from a first set of video signals and applied to a second set of video signals, whether those sets may correspond, for example, to one or more frames and/or different video sequences.

Although, in the examples presented above, the invention was described ii terms of image data in RGB color format, it will be understood that the present invention applies to chroma keying in any acceptable color format (e.g., YUV, YIQ). In addition, the chroma-key color range need not be defined by all three components. For example, in YUV color space, the chroma-key color range may be defined by ranges in only the U and V components. In that case, the chroma keying may not be adversely affected by changes to the intensity (i.e., Y component data) of the background due to shadowing or other lighting changes.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose microprocessor, the program code segments combine with the microprocessor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for performing chroma-key processing on images, comprising the steps of:

(a) receiving a first set of image signals comprising one or more components;

(b) generating a histogram for each of one or more of the components;

(c) generating a chroma-key color range from each histogram of the one or more histograms; and (d) performing chroma-key processing on a second set of image signals using the chroma-key color range.

2. The method of claim 1, wherein:

the first set of image signals corresponds to one or more video frames; and the second set of image signals corresponds to one or more other video frames.

3. The method of claim 1, wherein:

the image signals comprise R, G, and B components; and

R, G, and B histograms are generated for the R, G, and B components, respectively.

4. The method of claim 1, wherein, for first component of the Image signals, step (c) comprises the steps of:

(1) selecting an initial minimum value for the first component as a component value at which a specified number of pixels in the first set of image signals have component values that fall below the initial minimum value; and (2) selecting an initial maximum value for the first component as a component value at which a specified number of pixels in the first set of image signals have component values that fall above the initial maximum value.

5. The method of claim 4, wherein step (c) further comprises the steps of:

(3) generating a final minimum value for the first component by decreasing the initial minimum value; and (4) generating a final maximum value for the first component by decreasing the initial maximum value.

6. The method of claim 5, wherein:

step (c)(3) comprises the step of generating the final minimum value by decreasing the initial minimum value by a conservatism term directly proportional to a magnitude of a difference between the initial minimum value and the initial maximum value; and step (c)(4) comprises the step of generating the final maximum value by increasing the initial maximum value by the conservatism term.

7. The method of claim 6, wherein:

the first set of image signals corresponds to a first frame of a video sequence;

the second set of image signals corresponds to one or more other frames of the video sequence;

the image signals comprise R, G, and B components; and

R, G, and B histograms are generated for the R, G, and B components, respectively.

8. An apparatus for performing chroma-key processing on images, comprising:

(a) means for receiving a first set of image signals comprising one or more components;

(b) means for generating a histogram for each of one or more of the components;

(c) means for generating a chroma-key color range from each histogram of the one or more histograms; and (d) means for performing chroma-key processing on a second set of image signals using the chroma-key color range.

9. A storage medium encoded with machine-readable program code for performing chroma-key processing on images, comprising:

(a) means for causing a machine to receive a first set of image signals comprising one or more components;

(b) means for causing the machine to generate a histogram for each of one or more of the components;

(c) means for causing the machine to generate a chroma-key color range from each histogram of the one or more histograms; and (d) means for causing the machine to perform chroma-key processing on a second set of image signals using the chroma-key color range.

10. A transparency generator for performing chroma-key processing on images, wherein:

the transparency generator receives a first set of image signals comprising one or more components;

the transparency generator generates a histogram for each of one or more of the components;

the transparency generator generates a chroma-key color range from each histogram of the one or more histograms; and the transparency generator performs chroma-key processing on a second set of image signals using the chroma-key color range.

* * * * *